United States Patent
Upadhya et al.

(10) Patent No.: US 6,312,643 B1
(45) Date of Patent: Nov. 6, 2001

(54) SYNTHESIS OF NANOSCALE ALUMINUM ALLOY POWDERS AND DEVICES THEREFROM

(75) Inventors: Kamleshwar Upadhya, Quartz Hill; Wesley P. Hoffman, Palmdale, both of CA (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 08/957,013

(22) Filed: Oct. 24, 1997

(51) Int. Cl.⁷ ............... B22F 1/00; B22F 3/12; B22F 3/14
(52) U.S. Cl. ............... 419/33; 419/26; 419/30; 419/38; 419/49
(58) Field of Search .................. 419/33, 38, 49, 419/26, 30

(56) References Cited

U.S. PATENT DOCUMENTS

| | | | |
|---|---|---|---|
| 4,615,735 | * | 10/1986 | Ping .................................. 75/249 |
| 4,915,605 | * | 4/1990 | Chen et al. ........................ 419/6 |
| 5,509,978 | * | 4/1996 | Masumoto et al. ............... 148/403 |
| 5,561,829 | * | 10/1996 | Sawtell et al. .................... 419/13 |
| 5,788,738 | * | 8/1998 | Pirzada et al. .................... 75/331 |
| 5,984,997 | * | 11/1999 | Bickmore et al. ................. 75/343 |
| 6,020,419 | * | 2/2000 | Bock et al. ....................... 524/590 |
| 6,203,768 | * | 3/2001 | McCormick et al. ............. 423/1 |

* cited by examiner

Primary Examiner—Daniel J. Jenkins
(74) Attorney, Agent, or Firm—William G. Auton

(57) ABSTRACT

Nanoscale aluminum alloy powder is synthesized by mechanical alloying/milling techniques without significant oxidation, nitridation, or contamination with foreign materials. These powders are consolidated into a very dense billet form without a high temperature sintering step. The desired microstructure and properties were obtained by post hot isostatic pressing, extrusion, and/or forging of the nanoscale material billet made from the powders.

20 Claims, No Drawings

SYNTHESIS OF NANOSCALE ALUMINUM ALLOY POWDERS AND DEVICES THEREFROM

STATEMENT OF GOVERNMENT INTEREST

The invention described herein may be manufactured and used by or for the Government for governmental purposes without the payment of any royalty thereon.

BACKGROUND OF THE INVENTION

The present invention relates to the synthesis of nanoscale powders and the consolidation of these powders into bulk solid materials without inducing any significant grain growth into the nanoscale materials.

In conventional polycrystalline materials the majority of the atoms are in an ordered crystalline structure in the grains with a small percentage of the atoms being in the grain boundaries separating the grains. In conventional materials the volume fraction of grain and interface boundaries rarely exceeds more than a few percent, and therefore, the bulk properties are not affected significantly. Conventional powders can be prepared by methods such as gas condensation, rapid solidification, sputtering, mechanical alloying/milling, conventional vapor deposition, (either physical vapor deposition, PVD, or chemical vapor deposition, CVD), plasma assisted PVD/CVD, electrodeposition, plasma processing and sol-gel processes.

Of all the processes listed, only inert gas condensation, plasma processes and mechanical alloying are used widely to synthesize nanoscale materials. The inert gas condensation process is currently used only as a research technique because the production rate of nanoscale materials is only few grams per minute via this route. Plasma processes also are costly and difficult to scale-up for large scale production of nanoscale materials. Due to process flexibility and ease in scaling-up, mechanical milling/alloying has been widely used for producing nanoscale materials. The combination of increased strength, improved toughness and lower density of nanoscale materials makes them extremely attractive for space and propulsions applications.

Historically titanium alloys are the baseline material for aircraft and space applications. Although conventional coarse-grain aluminum alloys are lighter than titanium, they lack the sufficient specific strength needed for many applications as space and propulsion materials. However, aluminum nanoscale materials provide a unique opportunity for aircraft, space and armor applications as the properties of nanoscale aluminum alloy, such as tensile strength, hardness and toughness are vastly improved over those of traditional coarse-grain materials. In addition, the cost is less than that of titanium alloys.

Thus, there exists a need for a process for making a nanoscale material and products therefrom.

SUMMARY OF THE INVENTION

In this invention, a very simple and flexible powder synthesis and consolidation process is described which yields extremely high purity powders with small grain size and eliminates several cumbersome processing stages during consolidation of these powders. To mechanically mill and alloy the metal powders to form nanoscale alloy material, a commercially available attritor is used. The powder, which can have a narrow or a bimodal particle size distribution, is covered with a surfactant and blanketed with an ultra high purity inert gas. The advantage of surfactants is three-fold. First, it gets adsorbed around the particle surface and thus prevents oxidizing and nitriding of the particles. Secondly, it prevents cold-welding of the particles during attriting which eliminates particle size growth. Thirdly, during degassing at 100–250° C. and hot isostatic pressing at around 250–350° C. it desorbs completely leaving the virgin metallic surface which consolidates easily with full theoretical density even in a low temperature range such as 200–350° C. A continuous flow of ultra high purity inert gas is maintained over the top of the surfactant in order to prevent the escape of vapor surfactants and to prevent entrance of foreign gases. After the particles are attrited, the surfactant is removed, the powder is dried and degassed, and then the powder is consolidated at relatively low temperature.

Therefore, one object of the present invention is to provide a process for making nanoscale aluminum alloy powders and articles therefrom.

Another object of the present invention is to provide a process and articles therefrom having superior properties over titanium products.

Another object of the present invention is to provide products having improved properties for use in the aeronautics and astronautics area of technology.

These and many other objects and advantages of the present invention will be ready apparent to one skilled in the pertinent art from the following detailed description of a preferred embodiment of the invention and the related drawings.

DESCRIPTION OF THE PREFERRED EMBODIMENT

Nanoscale materials are single or multiphase polycrystals with grain sizes in the range of 1–100 nm in at least one direction. These materials, which can be metals, ceramic or composites are not usually exotic in their composition. They differ from the normal forms of the material only in the size of their grains and atomic arrangement at the grain boundary.

When the size of the crystallites in a polycrystalline material are reduced from normal macroscopic dimensions to the scale of few nanometers, there are several changes introduced into the morphology of these particles. First, interfaces are created in which local atomic arrangements, that is, short-range order (SRO) in the material, is different from that in the homogeneous ordered (crystalline) or disordered (liquid, glassy) states of matter. As the grain size is further reduced. the number of interfaces increases and the fraction of atoms on these interfaces becomes comparable to the number of atoms in crystallites themselves. For example, within a nanoscale material with a grain size of 5 nm, the volume fraction of atoms at the grain boundaries will be 60%. Hence, in nanocrystalline materials, the overall properties of solids will no longer be determined by the atomic interactions in the crystal lattice alone. Instead, these types of materials exhibit novel properties reflecting the significant contributions from the interfaces. Furthermore, the atomic structure in the interior of crystallites is also modified through the introduction of defects, strain fields or short range correlated static or dynamic displacements of atoms from their ideal crystal lattice positions.

Many physical and mechanical properties of the material will be modified as a result of the combined effects of these structural changes. These include the reduction of the length-scale on which there is coherency in the atomic arrangements, (long-range order, LRO) and the introduction of interfaces with an atomic short-range order, (SRO). However, this SRO at the interface is different form the one in the crystal lattice. Therefore, nanocrystalline materials exhibit increased room temperature strength, enhanced diffusivity, improved toughness, lower density, reduced elastic modulus, higher electrical resistivity, increased specific heat, higher CTE, lower thermal conductivity and superior soft magnetic properties in comparison to conventional coarse-grained materials.

It is well established that grain and interface boundaries play an important role in controlling the properties of ceramic and metallic materials. With the recent developments in nanocrystalline materials, the effect of interface and grain boundaries in determining the overall properties of materials has become a critical factor.

Nanoscale materials, which can be equiaxed in nature are termed nanostructured crystallites if they have 3-D nanostructures, filamentary nanostructured materials if they possess 2-D nanostructures, or lamellar nanostructures if they consist of a layered 1-D nanostructure. Furthermore, atom clusters and clusters assemblies are considered zerodimensional nanostructured materials. Of these four types of nanoscale materials, most effort has been directed toward the synthesizing and consolidation of the one- and three-dimensional nanostructured materials.

Nanocrystalline materials can be prepared by any method capable of producing very fine grain size simply by increasing the number of nucleation sites and reducing the grain growth rate during the formation of these particles. These methods include, gas condensation, rapid solidification, sputtering, mechanical alloying/milling, conventional vapor deposition, (either physical vapor deposition, PVD, or chemical vapor deposition, CVD), plasma assisted PVD/CVD, electrodeposition, plasma processing and sol-gel processes.

As has been previously stated, nanoscale aluminum materials have grain sizes that are typically less than 100 nm. In this range, the highly disordered grain boundaries account for a significant fraction of the volume of the structure. Furthermore, the grain boundaries are of a lower density than the bulk crystalline material and this can result in an overall bulk density reduction of approximately 5%. Ultralightweight nanoscale aluminum alloy materials are the "materials of choice"for future aerospace, propulsions and armored applications where significant weight reduction is required such as hypersonic spacecraft (X-33) or where enhanced improvement in performance is needed without an increase in weight such as with rockets and satellites.

One example of the use of nanoscale aluminum in aeronautics and astronautics is in impellers and inducers for liquid rocket engine turbopumps. Previously titanium alloys have been used for these impeller and inducers components which are required to operate in a liquid hydrogen environment. However, titanium is susceptible to hydride formation at low temperature and thus needs a protective coating. Also, its fatigue life is very poor at liquid hydrogen temperature. Furthermore, titanium exhibits hydrogen embrittlement and is costly to fabricate into components. Therefore, nanoscale aluminum alloy has been selected to replace titanium due to the following superior physical as well as mechanical properties. Nanoscale aluminum alloys possess lower density than titanium, do not exhibit hydrogen embrittlement, have vastly improved fatigue life over titanium alloys, and are compatible with liquid hydrogen which means they do not need a protective coating. Also. nanoscale aluminum is easy to fabricate into components which reduces parts counts and thus results in an overall cost reduction for the system.

A second important application will be in the commercial and military aircraft components where the temperature does not exceeds 150° C. While aircraft and engine manufacturers seek higher strength to weight ratio for many components and structural parts, they also need greater specific stiffness in order to obtain an increase in load transfer capacity of the materials. The main advantages of nanoscale aluminum again will be greater specific stiffness, lighter weight, lower cost of materials as well as fabrication of components. The lower weight of nanoscale aluminum alloy in comparison to titanium is achieved as a result of the combination of aluminum's lower density and also the increase in the volume fraction of grain boundaries which have lower density than the crystallites in the bulk material. Due to higher specific strength, greater stiffness as well as better wear and erosion resistance of nanoscale aluminum, this material will find use in many high performance applications including sports equipment (golf, tennis and sports bicycles), automotive, military ships, and especially for computer discs due to improve head slap resistance and greater stiffness than today's aluminum substrates.

The synthesis and processing of nanoscale aluminum powders requires great care and skills. Most of the currently used mechanical alloying techniques for synthesizing steel [1], copper or aluminum nanoscale powders employ liquid nitrogen as a grinding medium. The current thinking in using liquid nitrogen is that it makes soft metals brittle and helps in breaking the particles into smaller sizes. Also, covering the powders with liquid nitrogen prevents to some extent the oxidation of the metallic powders. Furthermore, the liquid nitrogen forms a thin nitride envelope surrounding the metallic particle which prevents grain growth during sintering and also imparts greater hardness to the components for use as cutting and drilling tools fabricated from these powders. This approach is suitable for synthesizing tool or cutting steel or tungsten carbide powders where high hardness value is the principle property sought. However, there are certain inherent disadvantages associated with liquid nitrogen as an attriting medium if additional properties are desired. In liquid nitrogen the metal powders form nitrides as well as oxides which reduces toughness of the components. in addition, due to the very high melting points of these oxides and nitrides, it is difficult to sinter these powders at temperature as low as 300–500° C. and obtain a 100% dense material. Because a much higher temperature is needed to sinter these powders, grain growth will occur and the improved physical and mechanical properties due to the nanosize grain will be lost. Finally, these oxides and nitrides reduce the toughness and adversely affects other desirable mechanical properties such as fatigue and creep as they are segregated mostly in the grain boundaries.

One approach that has been used to solve this problem with oxides and nitrides is to extrude components made from nanosize aluminum materials and forge them using multi-passes in order to break up the oxides and nitrides. This minimizes their adverse effects on the mechanical properties of nanocrystalline aluminum alloys. However, the preferred approach to take full advantage of the improved mechanical and physical properties of nanoscale materials should be to eliminate the use of liquid nitrogen during mechanical alloying and to minimize as much as possible the formation of oxides and nitrides.

Also, current practice for consolidation of these powders that were attrited using liquid nitrogen as an attriting medium is to degas them and hot isostatically press them into billets or rods. The temperature is kept around 265–320° C. in order to prevent grain growth. These consolidated pieces are then subjected to mechanical working processes such as extrusion or forging in order to obtain improved strength and toughness. The disadvantages of these current practices of extensive mechanical working include the following: While passing through a number of processing cycles an inherent grain growth occurs, the material picks up numerous unwanted foreign particles which are not desirable, and the material goes through excessive work hardening and becomes hard or brittle.

In this invention, a very simple and flexible powder synthesis and consolidation process is described which yields extremely high purity powders with small grain size and eliminates several cumbersome processing stages during consolidation of these powders. To mechanically mill and alloy the metal powders to form nanoscale alloy powder, a commercially available attritor is used. The powder, which can have a narrow or a bimodal particle size distribution, is covered with a surfactant and blanketed with an ultra high purity inert gas. The advantage of surfactants is three-fold. First, it gets adsorbed around the particle surface and thus prevents oxidizing and nitriding of the particles. Secondly, it prevents cold-welding of the particles during attriting which eliminates particle size growth. Thirdly, during degassing at 100–250° C. and hot isostatic pressing at around 250–350° C. it desorbs completely leaving the virgin metallic surface which consolidates easily with full theoretical density even in a low temperature range such as 200–350° C. A continuous flow of ultra high purity inert gas is maintained over the top of the surfactant in order to prevent the escape of vapor surfactants and to prevent entrance of foreign gases. After the particles are attrited, the surfactant is removed, the powder is dried and degassed, and then the powder is consolidated at relatively low temperature.

EXAMPLE 1

Ultra high purity aluminum alloy powder that contained less the 250–500ppm oxygen and nitrogen was used. The powder particle size was bimodel with 40% of the particles in the range of 2–8 um and the remaining 60% of the powder having a particle size of 8–14 um. The aluminum alloy powder composition was as follows: Zn 2.5–10.0%, Mg-1.0–6.4%, Cu- 1.0–1.72%, Zr- 0.20–6.5%, Ni-0.20–1.0%, Fe-0.1–1.20%, Si-0.05–1.5%, Mn-0.1–2.5%, Cr-0.1–2.5%, Ti-0.02–0.5%, B-0.1–1.0% by weight with the balance being aluminum. The Al alloy powder and the grinding medium, which consisted either of tool steel balls or tungsten carbide-coated tool steel balls with the powder to grinding medium ratio between 1:10 to 1:20, were placed in a 2½ gallon capacity stainless steel attritor vessel under inert atmosphere. To this vessel was added an organic surfactant(s), such as, hexane or isopropanol or the mixture of these two in a suitable quantity to cover the powder. A continuous flow of ultra high purity argon or other inert gas was maintained over the top of the surfactant in order to prevent the escape of surfactant vapors and to prevent entrance of foreign gases.

The attritor vessel containing aluminum alloy powder, grinding medium, and surfactant(s) was agitated vigorously under argon flow for a specified period with the lid sealed. Periodically powder specimens were withdrawn under inert atmosphere and the grain sizes were measured. Once the desired grain sizes were achieved, the attrited powder slurry was unloaded via the bottom valve of the attritor vessel into a container that was sealed under an inert environment and then placed in a glove-box type of chamber. (This container could be the same container used for degassing described below.)

The chamber was evacuated and back-filled with ultra high purity inert gas several times in order to remove atmospheric contaminants. After the powder had settled to the bottom of the container, the container was opened and the excess hexane was decanted off under inert atmosphere. A portion of the remaining hexane was allowed to vaporize under mild heating and vacuum, leaving the aluminum alloy nanoscale powder. (The glovebox-type chamber was equipped with a system to condense the hexane that evaporated for reuse.) Under inert atmosphere the aluminum alloy nanoscale powder was transferred to the drying/degassing container which was sealed under inert atmosphere and removed from the glovebox-type chamber.

This container was then placed in a vacuum-tight degassing chamber that had been opened while being flushed with ultra high purity inert gas to prevent entrance of atmospheric contaminents. After flowing inert atmosphere around the container, the drying/degassing container was opened under inert atmosphere and then the degassing chamber was sealed. The degassing chamber holding the powder in the drying/degassing container was then evacuated through a liquid nitrogen trap to remove any residual hexane. After the residual pressure reached 0.05 Torr the sample was pumped without the liquid nitrogen trap. The powder sample was then degassed at a suitable temperature (100–500° C.) until the pressure was reduced to $10^{-3}$ to $10^{-7}$ Torr. The degassing chamber was then back-filled with ultra high purity inert gas until the pressure slightly exceeded atmospheric pressure. The degassing chamber was then opened with a positive pressure of ultra high purity inert gas flowing out of the degassing chamber. The drying/degassing container was then sealed and placed again in the glovebox-type chamber. (Of course, if the glovebox-type chamber was of sufficient size, the degassing chamber could be placed inside it and the various transfer steps between the glovebox-type chamber and the degassing chamber mentioned above would be unnecessary.)

After several cycles of evacuation and back-filling with ultra high purity inert gas, the container was opened and the degassed powder was placed under inert atmosphere into a seamless spun aluminum can. The lid of the can was placed on the can and under inert atmosphere the can was transferred to an electron beam welder. The lid of the can was then electron beam welded onto the can under vacuum. (Obviously, if the gloveboxtype chamber was large enough, the welder could be placed inside the chamber and external transfer would be avoided.) After the can was sealed it was transferred to the hot isostatic press where it was pressed under a pressure of (10–50 ksi) at 265° C. unitl the density of the consolidated aluminum alloy powder was greater than 98.5% of the theoretical density. After the can was removed from the hot isostatic press and the consolidated part was removed from the can, the nanoscale aluminum alloy part was machined and extruded resulting in a diameter reduction of at least 3.

Specimens were tested for determination of physical and mechanical properties. The grain size was found to be in the range of 40–60 nm. Vickers hardness was determined to be 1.390 Gpa, the tensile strength was in the range of 90–102 ksi, and the ductility was found to be 4–6%. The hardness of this nanoscale aluminum alloy material was thus 5–6 times and the tensile strength approximately was three times that of an alloy of similar composition with conventional grain size. Although the strength and hardness were both increased, there was no significant decrease in ductility.

EXAMPLE 2

In a preferred mode of fabricating nanocrystalline aluminum alloy components, the powders were prepared and degassed as stated in Example 1. Under inert atmosphere in the glovebox-type chamber, the degassed powders were packed and sealed into a rubber mold, which was then cold isostatically pressed at room temperature to a pressure of 10,000–50,000 psi. After removal of the mold from the press and the consolidated powder from the mold, a billet of nanocrystalline aluminum alloy material had been produced with 94–98% of the theoretical density of the particular aluminum alloy used. This nanocrystalline aluminum alloy billet, without being placed in a can or any other form of encapsulation, was then hot isostatically pressed under argon atmosphere at around 250–550° C. for 1–5 hours using a pressure of 10–50 ksi. After pressing, the billet had a very high proportion of chemical bonding and almost 100% of theoretical density.

To further enhance the specific properties of the billet required for certain applications, it can be extruded or forged followed by suitable heat-treatment in order to eliminate any residual porosity. The billet would then be machined to the final shaped required for the specific application. Alternatively, since the cold isostatic press mold can be made in any conceivable shape, net-shaped or near-net-shaped parts can be made directly by this process. Thus, for some applications, extrusion, forging, subsequent heat treatment, and post-fabrication machining will not be used.

The main advantages of this preferred processing route are the following: The powder is not exposed to liquid nitrogen. Excessive exposure of the degassed nanocrystalline powder to the environment is eliminated and thus further formation of undesirable oxides and nitrides can be prevented. The electron beam welding of the aluminum can containing degassed nanocrystalline powders, which inherently contributes to oxidizing of the degassed powder, is eliminated. This also saves money as electron beam welding is very costly. The use of a seamless spun aluminum can for hot isostatically pressing is eliminated which further reduces the cost. By cold isostatically pressing the powders immediately after degassing, the total time required for hot isostatic pressing, which causes grain growth and is a much costlier process than cold isostatic pressing, is reduced.

It should be mentioned that an alternate approach to the preferred approach of cold isostatic pressing of the degassed powders at high pressure is to cold isostatically press non-degassed powders at a lower pressure to obtain a porous material with open porosity. This porous billet, which has 60–70% of the theoretical density, could then be degassed, sintered, and hot isostatically pressed to obtain a dense billet. For this billet, extrusion with a very high area reduction ratio (10:1–70:1) is necessary to eliminate the porosity. Forging can also be performed to obtain isotropic properties throughout the body of material. Also a suitable heat-treatment step is necessary to obtain the desired microstructure along with the desired mechanical properties. The disadvantage of this alternate technique is that high temperature sintering must be performed to densify the material to 95–98% density before hot isostatic pressing can be performed. This step not only increases the cost of processing due to an increase in the number of steps as well as energy costs, but also results in grain growth which decreases the enhanced properties of the nanoscale materials.

Clearly many modifications and variations of the present invention are possible in light of the above teachings and it is therefore understood, that within the inventive scope of the inventive concept, that the invention may be practiced otherwise than specifically claimed.

What is claimed is:

1. A process for making nanoscale aluminum alloy powder for the manufacture of articles, said process comprising the steps of:

providing aluminum alloy powder;

placing the powder under an inert atmosphere in a mechanical attritor containing balls with a powder to grinding medium ratio between 1:10 to 1:20;

covering the powder and balls with a surfactant medium;

attriting the powder in the surfactant medium under an inert atmosphere until the powder forms a homogeneous alloy slurry in which the grain size of the metal powder has been reduced to the size range of from about 1 to about 250 nm;

placing the attrited powder slurry under an inert atmosphere into a container and sealing it;

placing the sealed container in a glovebox-type chamber under an inert atmosphere;

opening the sealed container in the chamber;

decanting the excess surfactant;

partially evacuating the chamber while heating the slurry so that the surfactant will quickly evaporate;

placing the aluminum alloy powder in a drying/degassing container and sealing the container under inert atmosphere;

transferring the drying/degassing container to the drying/degassing chamber which is being flushed with inert gas;

opening the container under an inert atmosphere, sealing the dryng/degassing chamber, and evacuating the chamber to 0.01 Torr while trapping any residual surfactant;

heating the degassing chamber to a temperature of at least 150° C. and holding at the maximum temperature until the residual pressure decreases to less than $10^{-3}$ Torr;

when the desired residual pressure is reached, pressurizing the drying/degassing chamber with an ultra high purity inert gas until the pressure is greater than atmospheric pressure;

opening the drying/degassing chamber when the desired pressure is reached, maintaining a flow of ultra high purity inert gas so that the dried and degassed powder is not exposed to the atmosphere;

sealing the drying/degassing container under inert atmosphere and transferring it again to the glovebox-type chamber which is evacuated and then filled with ultra high purity inert gas to atmospheric pressure at least once;

opening the container and transferring the dry and degassed aluminum alloy powder under the inert atmosphere to a mold used for cold isostatic pressing;

evacuating the mold and sealing it;

pressurizing the sealed mold in a cold isostatic press to at least 10,000 psi and holding the pressure for at least 30 minutes, depressurizing the press, removing the sealed mold, and then removing the compacted green body from the mold;

placing the compacted sample in a hot isostatic press without any form of encapsulation and heating to a temperature in the range of 250–550° C. at a pressure between 10 and 50 ksi; and removing the compacted sample being the nanoscale aluminum alloy billet.

2. A process as described in claim 1 wherein a step of forming a homogeneous mixture of the metal powder occurs before the powder is placed in the attritor.

3. A process as described in claim 1 wherein the powder contains less than about 250 ppm oxygen.

4. A process as described in claim 1 wherein the aluminum alloy powder has a bimodal distribution of particle sizes.

5. A process as described in claim 1 wherein the grinding medium are tool-steel balls, tungsten carbide-coated tool-steel balls or balls of similar material.

6. A process as described in claim 1 wherein the ultra high purity inert gas is high purity argon that has been passed through a purifier to remove traces of oxygen and nitrogen.

7. A process as described in claim 1 wherein the surfactant is selected from the group consisting of hexane, isopropanol or a mixture of these materials.

8. A process as described in claim 1 further including the steps of trapping, condensing, and reusing the surfactant after it is evaporated from the aluminum alloy slurry.

9. A process as described in claim 1 further including the steps of extruding and/or forging followed by heat-treatment to enhance the properties of the billet.

10. A process as described in claim 1 further including the step of machining the billet to a final shape.

11. A process for making nanoscale aluminum alloy powder for the manufacture of articles, said process comprising the steps of:

providing aluminum alloy powder;

placing the powder under an inert atmosphere in a mechanical attritor containing balls with a powder to grinding medium ratio between 1:10 to 1:20;

covering the powder and balls with a surfactant medium;

attriting the powder in the surfactant medium under an inert atmosphere until the powder forms a homogeneous alloy slurry in which the grain size has been reduced to the size range of from about 1 to about 250 nm;

placing the attrited powder slurry under an inert atmosphere into a drying/degassing container and sealing it;

placing the sealed container in a glovebox-type chamber under an inert atmosphere;

opening the sealed container in the chamber;

decanting the excess surfactant;

partially evacuating the chamber while heating the slurry so that the surfactant will quickly evaporate;

sealing the container under inert atmosphere;

transferring the drying/degassing container to the drying/degassing chamber being flushed with argon;

opening the container under an inert atmosphere, sealing the dryng/degassing chamber, and evacuating the chamber to 0.01 Torr while trapping any residual hexane heating the degassing chamber to a temperature of at least 150° C. and holding at the maximum temperature until the residual pressure decreases to less than $10^-$ Torr;

when the desired residual pressure is reached, pressurizing the degassing chamber with an ultra high purity inert gas until the pressure is greater than atmospheric pressure;

opening the degassing chamber when the desired pressure is reached, maintaining a flow of ultra high purity inert gas so that the degassed powder is not exposed to the atmosphere;

sealing the drying/degassing container and transferring again to the glovebox-type chamber which is evacuated and then filled with ultra high purity inert gas to atmospheric pressure at least once;

opening the container and transferring the dried and degassed aluminum alloy powder under inert atmosphere to an aluminum can used for hot isostatic pressing;

evacuating the can and then sealing the can by electron beam welding;

placing the sealed can in the hot isostatic press and pressurizing it to at least 10,000 psi;

holding the pressure in the hot isostatic press for at least 30 minutes with the temperature maintained between 200 and 550° C.; and depressurizing the press, removing the sealed can, and removing the compacted material, being the nanoscale aluminum alloy billet, from the can.

12. A process as described in claim 11 wherein a step of forming a homogeneous mixture of the metal powder occurs before the powder is placed in the attritor.

13. A process as described in claim 11 wherein the powder contains less than about 250 ppm oxygen.

14. A process as described in claim 11 wherein the aluminum alloy powder has a bimodal distribution of particle sizes.

15. A process as described in claim 11 wherein the grinding medium are tool-steel balls, tungsten carbide-coated tool-steel balls or balls of similar material.

16. A process as described in claim 11 wherein the ultra high purity inert gas is high purity argon that has been passed through a purifier to remove traces of oxygen and nitrogen.

17. A process as described in claim 11 wherein the surfactant is selected from the group consisting of hexane, isopropanol, or a mixture of these materials.

18. A process as described in claim 11 further including the steps of trapping, condensing, and reusing the surfactant after it is evaporated from the aluminum alloy slurry.

19. A process as described in claim 11 further including the steps of extruding and/or forging followed by heat-treatment to enhance the properties of the billet.

20. A process as described in claim 11 further including the step of machining the billet to a final shape.

* * * * *